(12) United States Patent
Lobovski et al.

(10) Patent No.: US 12,493,273 B2
(45) Date of Patent: Dec. 9, 2025

(54) INPUT/OUTPUT (IO) HANDLING DURING UPDATE PROCESS FOR MANUFACTURING SYSTEM CONTROLLER

(71) Applicant: APPLIED MATERIALS, INC., Santa Clara, CA (US)

(72) Inventors: Eugene Lobovski, San Jose, CA (US); Dmitry Panasyuk, Santa Clara, CA (US); Jithendran Venkatesan, Cupertino, CA (US); Sandeep Roy, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 636 days.

(21) Appl. No.: 17/678,817

(22) Filed: Feb. 23, 2022

(65) Prior Publication Data
US 2022/0277974 A1 Sep. 1, 2022

Related U.S. Application Data

(60) Provisional application No. 63/155,265, filed on Mar. 1, 2021.

(51) Int. Cl.
*G05B 19/042* (2006.01)
*H01L 21/67* (2006.01)

(52) U.S. Cl.
CPC .... *G05B 19/0423* (2013.01); *H01L 21/67276* (2013.01); *G05B 2219/2602* (2013.01)

(58) Field of Classification Search
CPC ........ G05B 19/0423; G05B 2219/2602; G05B 19/0426; H01L 21/67276; H01L 21/67103;
(Continued)

(56) References Cited

U.S. PATENT DOCUMENTS

2006/0259198 A1 11/2006 Brcka et al.
2008/0243988 A1* 10/2008 Huang ............... G05B 19/4183
709/202
(Continued)

FOREIGN PATENT DOCUMENTS

CN 111719130 A 9/2020
JP 2006-269842 A 10/2006
(Continued)

OTHER PUBLICATIONS

PCT International Search Report and Written Opinion for International Application No. PCT/US2022/18232 mailed Jun. 21, 2022, 8 pages.

*Primary Examiner* — Christopher E. Everett
(74) *Attorney, Agent, or Firm* — Lowenstein Sandler LLP

(57) ABSTRACT

Methods and systems for input/output (IO) handling during an update process for a manufacturing system controller are provided. First notifications are transmitted by an IO driver of a system controller between components of a process chamber and a substrate process IO handler of the system controller. The substrate process IO handler executes substrate process control instructions corresponding to a process recipe. The first notifications correspond to operations associated with substrate process control instructions. A determination is made that substrate process control instructions are to be updated. A detection is made that the substrate process is terminated. Second notifications are transmitted between the components of the process chamber and a system IO handler. The system update IO handler executes system update control instructions including commands configured to cause the components of the process chamber to maintain an environment of the process chamber at a target condition while the substrate process control instructions are updated.

20 Claims, 5 Drawing Sheets

(58) Field of Classification Search
CPC ........... H01L 21/6719; H01L 21/67248; H01L 21/67253; Y02P 90/02
See application file for complete search history.

(56) References Cited

U.S. PATENT DOCUMENTS

| | | | |
|---|---|---|---|
| 2010/0125360 A1* | 5/2010 | Huang | G05B 19/4183 |
| | | | 700/121 |
| 2012/0101761 A1 | 4/2012 | Lee | |
| 2021/0003990 A1 | 1/2021 | Mizuguchi et al. | |
| 2024/0068466 A1* | 2/2024 | Uchiki | F04C 28/00 |

FOREIGN PATENT DOCUMENTS

| | | | |
|---|---|---|---|
| JP | 2008078630 A | 4/2008 |
| JP | 2009158626 A | 7/2009 |
| JP | 2020053506 A | 4/2020 |
| KR | 20080017811 A | 2/2008 |

\* cited by examiner

INPUT/OUTPUT (IO) HANDLING DURING UPDATE PROCESS FOR MANUFACTURING SYSTEM CONTROLLER

RELATED APPLICATIONS

This application claims the benefit of U.S. Provisional Application No. 63/155,265 filed, Mar. 1, 2021, the entire contents of which are hereby incorporated by reference herein.

TECHNICAL FIELD

Embodiments of the present disclosure relate, in general, to manufacturing systems and more particularly to input/output (IO) handling during an update process for a manufacturing system controller.

BACKGROUND

A system controller at a manufacturing system can control chambers of a manufacturing system to process substrates at the manufacturing system according to a process recipe. The system controller can also maintain an environment of the process chamber at a target condition between substrate processes. In some instances, software of the system controller is updated to integrate new functionality into the system controller or to remedy any errors (e.g., software bugs) in the existing system controller software. During the software update, the process chamber is shut down (e.g., a temperature of the process chamber is brought to ambient temperature, vacuum pressure is removed from the process chamber, etc.) and the process chamber is restarted after the software update is complete. While the process chamber is shut down, conditions of the process chamber environment can deteriorate and it can take a significant amount of time (e.g., hours, days, weeks, etc.) to restore the conditions of the process chamber to an acceptable condition before the process chamber can be used to process substrates as before the software update. As a result, software updates have a significant negative impact on productivity and the amount of substrates that can be processed by a manufacturing system.

SUMMARY

Some of the embodiments described cover a method for input/output (IO) handling during an update process for a manufacturing system controller. The method includes transmitting, by an input/output (IO) driver of a system controller, a first set of notifications between one or more components of a process chamber and a substrate process IO handler of the system controller. The substrate process IO handler is configured to execute a set of substrate process control instructions corresponding to a process recipe during a substrate process at the process chamber. The first set of notifications correspond to one or more operations associated with the set of substrate process control instructions. The method further includes determining that the set of substrate process control instructions is to be updated. The method further includes detecting that the substrate process is terminated at the process chamber. The method further includes transmitting a second set of notifications between the one or more components of the process chamber and a system update IO handler of the system controller. The system update IO handler is configured to execute a set of system update control instructions including commands configured to cause the one or more components of the process chamber to maintain an environment of the process chamber at a target condition while the set of substrate process control instructions are updated. The second set of notifications correspond to one or more operations associated with the set of system update control instructions.

Some embodiments of the present disclosure are directed to a system including a memory and a processing device. The processing device is configured to perform operations including transmitting, by an input/output (IO) driver of a system controller, a first set of notifications between one or more components of a process chamber and a substrate process IO handler of the system controller. The substrate process IO handler is configured to execute a set of substrate process control instructions corresponding to a process recipe during a substrate process at the process chamber. The first set of notifications correspond to one or more operations associated with the set of substrate process control instructions. The operations further include determining that the set of substrate process control instructions is to be updated. The operations further include detecting that the substrate process is terminated at the process chamber. The operations further include transmitting a second set of notifications between the one or more components of the process chamber and a system update IO handler of the system controller. The system update IO handler is configured to execute a set of system update control instructions including commands configured to cause the one or more components of the process chamber to maintain an environment of the process chamber at a target condition while the set of substrate process control instructions are updated. The second set of notifications correspond to one or more operations associated with the set of system update control instructions.

In some embodiments, a non-transitory computer readable storage medium includes instructions that, when executed by a processing device, cause the processing device to perform operations including transmitting, by an input/output (IO) driver of a system controller, a first set of notifications between one or more components of a process chamber and a substrate process IO handler of the system controller. The substrate process IO handler is configured to execute a set of substrate process control instructions corresponding to a process recipe during a substrate process at the process chamber. The first set of notifications correspond to one or more operations associated with the set of substrate process control instructions. The operations further include determining that the set of substrate process control instructions is to be updated. The operations further include detecting that the substrate process is terminated at the process chamber. The operations further include transmitting a second set of notifications between the one or more components of the process chamber and a system update IO handler of the system controller. The system update IO handler is configured to execute a set of system update control instructions including commands configured to cause the one or more components of the process chamber to maintain an environment of the process chamber at a target condition while the set of substrate process control instructions are updated. The second set of notifications correspond to one or more operations associated with the set of system update control instructions.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
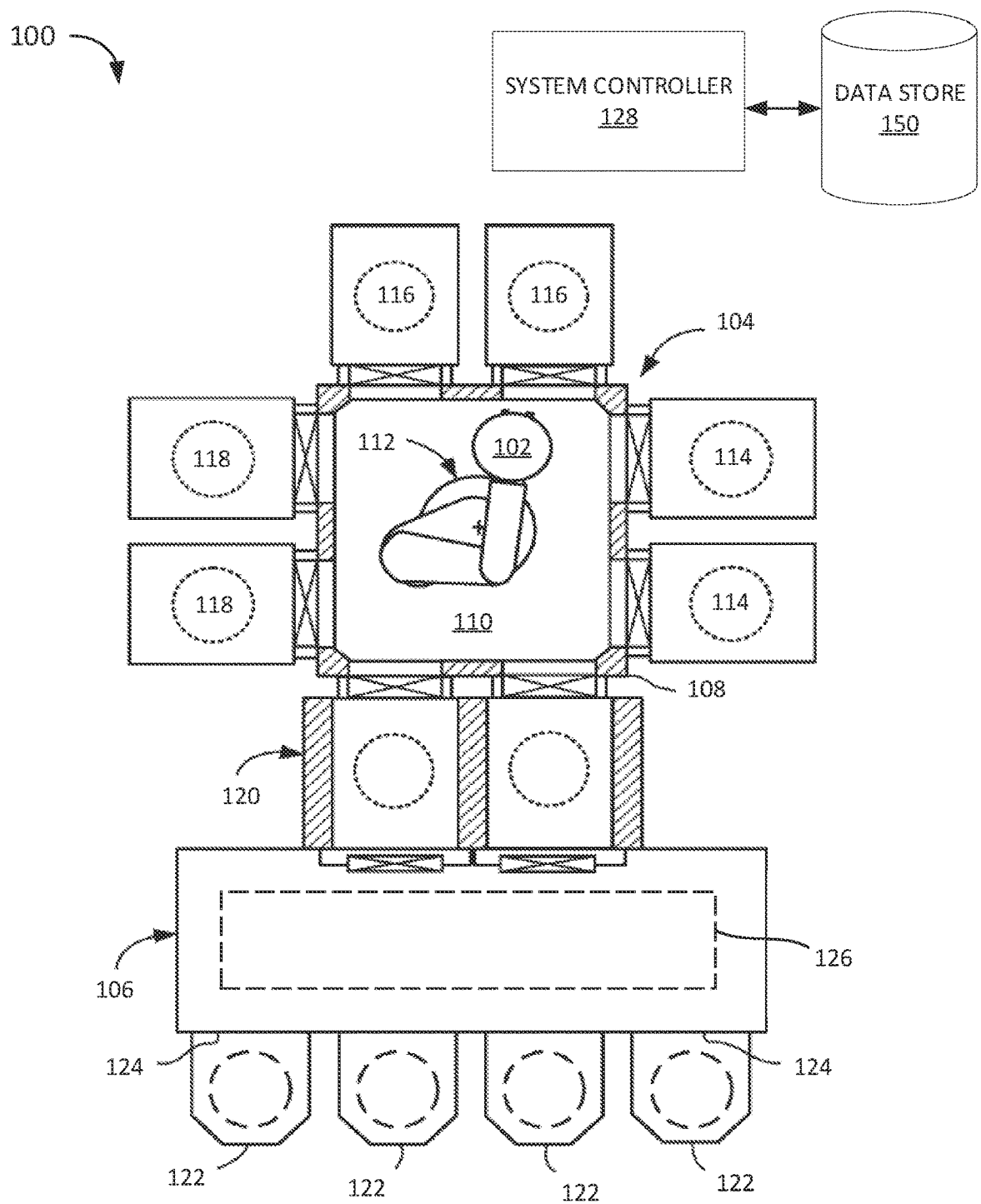
FIG. 1 is a top schematic view of an example manufacturing system, according to aspects of the present disclosure.

Implementations described herein provide systems and methods for input/output (IO) handling during an update process for a manufacturing system controller. A system controller for a manufacturing system can execute instructions to cause one or more components at a process chamber to perform a substrate process. In some embodiments, the instructions can correspond to operations of a process recipe for the substrate process. In other or similar embodiments, the instructions can correspond to operations for maintaining an environment of the process chamber at a target condition (e.g., between substrate processes performed at the process chamber).

In some instances, the instructions executed by the system controller can be updated to add additional functionality to the system controller and/or to remove any defective instructions (i.e., software bugs). The system controller cannot execute instructions for the manufacturing system during the instruction update process. Accordingly, stations of the manufacturing system are traditionally shut down before the update process for the system controller is initiated. For example, a temperature of a process chamber of the manufacturing system can be brought to the ambient temperature of the factory floor. In another example, a pump system for the process chamber can be turned off, removing vacuum pressure from the process chamber. After the update process for the system controller is completed, the stations of the manufacturing system are restarted. For example, the temperature of the process chamber is brought to the temperature before the process chamber shut down. In another example, the pump system for the process chamber is turned on, introducing vacuum pressure to the process chamber.

In some instances, the amount of time to bring the manufacturing system environment back to the same condition as before the system controller update process can be significantly long. For example, the temperature of the process chamber can be significantly high before the update process and it can take a significant amount of time (e.g., minutes, hours, etc.) to bring the temperature of the process chamber to the high temperature from the ambient temperature of the factory floor. In other instances conditions of the manufacturing system environment can significantly deteriorate during the system controller update process. For example, foreign particles can be introduced into a process chamber during the system controller update process. A significant amount of damage can result to the process chamber and/or substrates processed at the process chamber if the foreign particles are not removed before the process chamber is brought back into production. It can take a significant amount of time (e.g., hours, days, weeks, etc.) for the pump system of the process chamber to remove the foreign particles introduced into the process chamber during the system controller update process. As bringing the manufacturing system environment to the same condition as before the controller update and remedying any deteriorating conditions that resulted during the controller update can take a significant amount of time, a system controller update can have a significant impact on an overall performance of the manufacturing system. For example, the amount of time dedicated to performing the system controller update can significantly reduce an overall efficiency and throughput for the manufacturing system and can increase an overall system latency.

Aspects of the present disclosure address the above noted deficiencies by providing systems and methods for input/output (IO) handling during an update process for a manufacturing system controller. An IO module of the system controller can be configured to handle IO communications received from components of the manufacturing system. The IO module can include an IO driver that is configured to transmit notifications between the manufacturing system components and the system controller via an IO device of the system controller. During operation of the manufacturing system, the IO device can transmit notifications between the manufacturing system components and a substrate process control module of the system controller. The substrate process control module can be configured to execute substrate process control instructions that include operations corresponding to a process recipe for a substrate process at the manufacturing system. In some embodiments, the substrate process control instructions can also include operations that cause the components of the manufacturing system to maintain an environment of the manufacturing system at a target condition (e.g., between substrate processes).

In some embodiments, the IO module can determine that the substrate process control instructions are to be updated (e.g., to add functionality for the system controller, to remove defective instructions from the substrate process control instructions, etc.). In response to determining that a current substrate process performed at the manufacturing system is terminated, the IO module can cause the IO driver to transfer direction of IO communications received at the IO device from the substrate process control module to a system update module of the IO module. The system update module can be configured to execute a set of system update instructions that includes operations to cause the components of the manufacturing system to maintain an environment of the manufacturing system at a target condition for the duration of the system controller update. For example, the system update instructions can include operations to cause a heating element of a process chamber of the manufacturing system to maintain the temperature of the process chamber at a target temperature for the duration of the system controller update. In another example, the system update instructions can include operations to cause a pump system of the process chamber to maintain vacuum pressure in the process chamber, preventing the introduction of foreign particles into the process chamber during the system controller update process. In response to determining that the system controller update process is completed, the IO module can cause the IO driver to transfer direction of IO communications received at the IO device back to the substrate process control module and the substrate process control module can perform the substrate process at the manufacturing system according to the updated set of substrate process control instructions, as described above.

Aspects of the present disclosure address deficiencies of the conventional technology by providing systems and methods for handling IO communications at a system controller during a system controller update process, which prevents a shutdown of stations at the manufacturing system. The system update module at the system controller can execute instructions to maintain the environment of the manufacturing system at a target condition. This reduces the amount of time dedicated to bringing the environment of the manufacturing system back to the target condition after the system controller update process is complete. This further reduces the likelihood that conditions of the manufacturing system environment will deteriorate during the system controller update process, further reducing the amount of time that is dedicated to bringing the manufacturing system environment back to the target condition. As a result, an overall efficiency and throughput of the manufacturing system increases and an overall latency for the manufacturing system decreases.

FIG. 1 is a top schematic view of an example manufacturing system 100, according to aspects of the present disclosure. Manufacturing system 100 can perform one or more processes on a substrate 102. Substrate 102 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 100 can include a process tool 104 and a factory interface 106 coupled to process tool 104. Process tool 104 can include a housing 108 having a transfer chamber 110 therein. Transfer chamber 110 can include one or more process chambers (also referred to as process chambers) 114, 116, 118 disposed therearound and coupled thereto. Process chambers 114, 116, 118 can be coupled to transfer chamber 110 through respective ports, such as slit valves or the like. Transfer chamber 110 can also include a transfer chamber robot 112 configured to transfer substrate 102 between process chambers 114, 116, 118, load lock 120, etc. Transfer chamber robot 112 can include one or multiple arms where each arm includes one or more end effectors at the end of each arm. The end effector can be configured to handle particular objects, such as wafers.

Process chambers 114, 116, 118 can be adapted to carry out any number of processes on substrates 102. A same or different substrate process can take place in each process chamber 114, 116, 118. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 114, 116, 118 can each include one or more sensors configured to capture data for substrate 102 before, after, or during a substrate process. For example, the one or more sensors can be configured to capture spectral data and/or non-spectral data for a portion of substrate 102 during a substrate process. In other or similar embodiments, the one or more sensors can be configured to capture data associated with the environment within process chamber 114, 116, 118 before, after, or during the substrate process. For example, the one or more sensors can be configured to capture data associated with a temperature, a pressure, a gas concentration, etc. of the environment within process chamber 114, 116, 118 during the substrate process.

A load lock 120 can also be coupled to housing 108 and transfer chamber 110. Load lock 120 can be configured to interface with, and be coupled to, transfer chamber 110 on one side and factory interface 106. Load lock 120 can have an environmentally-controlled atmosphere that can be changed from a vacuum environment (wherein substrates can be transferred to and from transfer chamber 110) to an at or near atmospheric-pressure inert-gas environment (wherein substrates can be transferred to and from factory interface 106) in some embodiments. Factory interface 106 can be any suitable enclosure, such as, e.g., an Equipment Front End Module (EFEM). Factory interface 306 can be configured to receive substrates 102 from substrate carriers 122 (e.g., Front Opening Unified Pods (FOUPs)) docked at various load ports 124 of factory interface 106. A factory interface robot 126 (shown dotted) can be configured to transfer substrates 102 between carriers (also referred to as containers) 122 and load lock 120. Carriers 122 can be a substrate storage carrier or a replacement part storage carrier.

Manufacturing system 100 can also be connected to a client device (not shown) that is configured to provide information regarding manufacturing system 100 to a user (e.g., an operator). In some embodiments, the client device can provide information to a user of manufacturing system 100 via one or more graphical user interfaces (GUIs).

Manufacturing system 100 can also include a system controller 128. System controller 128 can be and/or include a computing device such as a personal computer, a server computer, a programmable logic controller (PLC), a microcontroller, and so on. System controller 128 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 128 can include a data storage device (e.g., one or more disk drives and/or solid state drives), a main memory, a static memory, a network interface, and/or other components.

System controller 128 can execute instructions to perform any one or more of the methodologies and/or embodiments described herein. In some embodiments, system controller 128 can execute instructions to perform one or more operations at manufacturing system 100 in accordance with a process recipe. The instructions can be stored on a computer readable storage medium, which can include the main memory, static memory, secondary storage and/or processing device (during execution of the instructions). In some embodiments, the instructions can be stored at data store 150. Data store 150 can be included as a component within system controller 128 or can be a separate component from system controller 128.

In some embodiments, system controller 128 can receive notifications for one or more components at process tool 104. An input/output (IO) driver of system controller 128 can receive the notification from the component at process tool 104 an can forward data included in the notification to an appropriate IO handler of system controller 128. Further details regarding the 10 driver of system controller 128 are provided with respect to FIG. 3.

Figure 2:
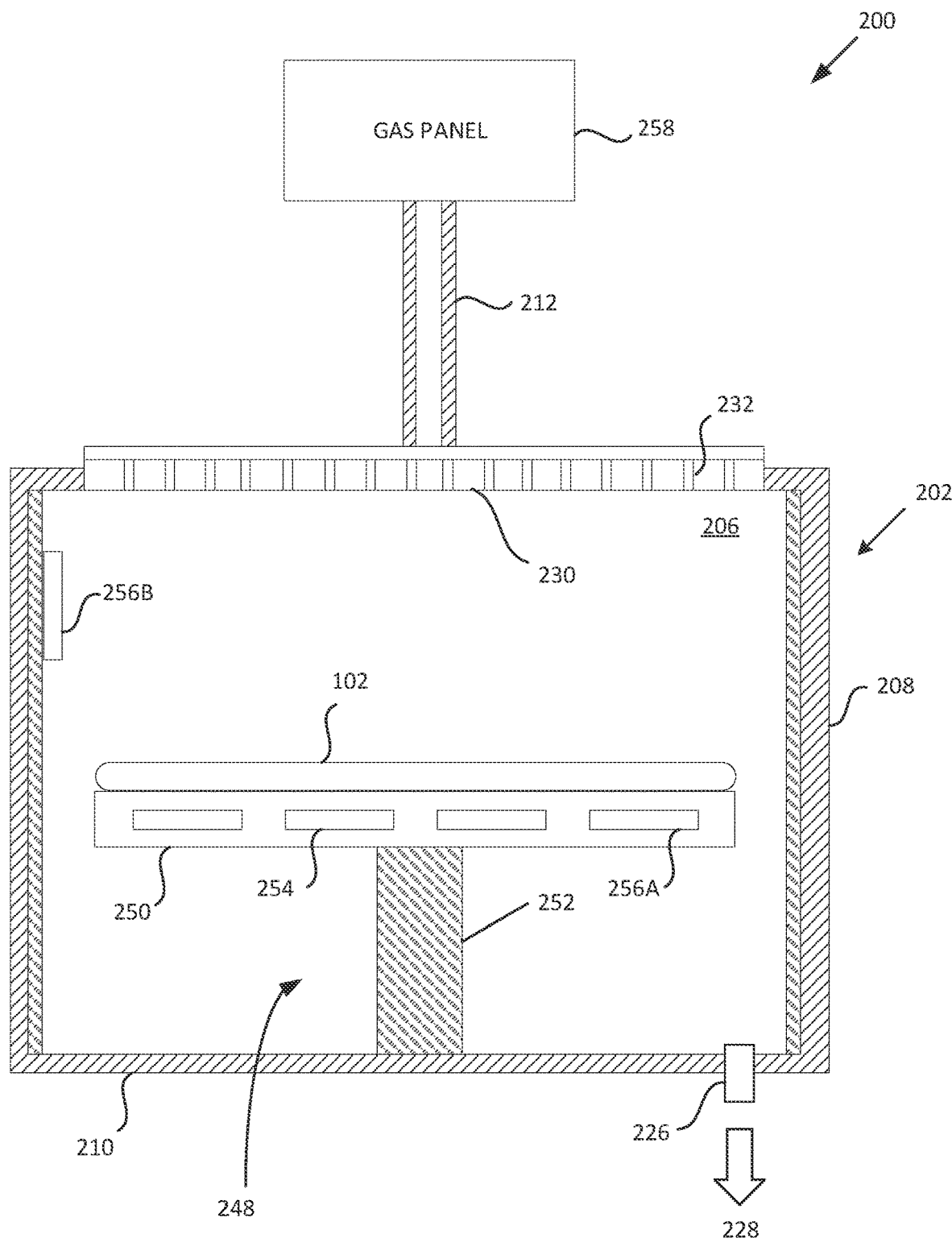
FIG. 2 is a cross-sectional schematic side view of an example process chamber of the example manufacturing system, according to aspects of the present disclosure.

FIG. 2 is a cross-sectional schematic side view of an example process chamber 200 of the example manufacturing system, according to aspects of the present disclosure. In some embodiments, process chamber 200 can correspond to process chamber 114, 116, 118, described with respect to FIG. 1. Process chamber 200 can be used for processes in which a corrosive plasma environment is provided. For example, the process chamber 200 can be a chamber for a plasma etcher or plasma etch reactor, and so forth. In another example, process chamber can be a chamber for a deposition process, as previously described. In one embodiment, the process chamber 200 includes a chamber body 202 and a showerhead 230 that encloses an interior volume 206. The showerhead 230 can include a showerhead base and a showerhead gas distribution plate. Alternatively, the showerhead 230 can be replaced by a lid and a nozzle in some embodiments, or by multiple pie shaped showerhead compartments and plasma generation units in other embodiments. The chamber body 202 can be fabricated from aluminum, stainless steel or other suitable material such as titanium (Ti). The chamber body 202 generally includes sidewalls 208 and a bottom 210. An exhaust port 226 can be defined in the chamber body 202, and can couple the interior volume 206 to a pump system 228. The pump system 228 can include one or more pumps and throttle valves utilized to evacuate and regulate the pressure of the interior volume 206 of the process chamber 200. In some embodiments, pump system 228 can maintain a vacuum environment within the internal volume 206 of process chamber 200 and can remove processing byproducts or other particles from process chamber 200.

The showerhead 230 can be supported on the sidewall 208 of the chamber body 202. The showerhead 220 (or lid) can be opened to allow access to the interior volume 206 of the process chamber 200, and can provide a seal for the process chamber 200 while closed. A gas panel 258 can be coupled to the process chamber 200 to provide process and/or cleaning gases to the interior volume 206 through the showerhead 230 or lid and nozzle (e.g., through apertures of the showerhead or lid and nozzle). The showerhead 230 can include a gas distribution plate (GDP) and can have multiple gas delivery holes 232 (also referred to as channels) throughout the GDP.

A substrate support assembly 248 is disposed in the interior volume 206 of the process chamber 200 below the showerhead 230. The substrate support assembly 248 holds a substrate 102 during processing (e.g., during a deposition process). Substrate support assembly 248 generally includes at least a substrate support (not shown) that can include a vacuum chuck, an electrostatic chuck, a susceptor, or other workpiece support surface. In some embodiments, substrate support assembly 248 can also include one or more heating elements 254. The heating elements 254 can be disposed on a surface of substrate support assembly 248 or embedded into a body of substrate support assembly 248, as illustrated in FIG. 2. The heating elements can be configured to elevate the temperature of substrate support assembly 248 and the supported substrate 102 to a temperature specified in a process recipe during a substrate process at process chamber 200. In some embodiments, the heating elements can be further configured to elevate the temperature of an environment of the internal volume 206 of process chamber, (e.g., when a substrate 102 is not disposed at substrate support assembly 248).

Process chamber 200 can include one or more sensors 256 that are configured to generate data for substrate 102 and/or an environment surrounding substrate 102 before, after, or during processing of substrate 102. Each sensor 256 can be configured to transmit data to a controller, such as system controller 128. In some embodiments, one or more sensors 256 can be embedded within a component of process chamber 200 and can be configured to capture data associated with a function of a component or element of process chamber 200. For example, sensor 256A can be embedded within substrate support assembly 248 and can generate data associated with a temperature of one or more heating elements 254 embedded within substrate support assembly 248, a lateral temperature profile of substrate support assembly 248, an amount of power supplied by a chucking power source to an electrostatic chuck of substrate support assembly 248, etc. In other or similar embodiments, sensors 256 can be disposed on or embedded within a surface of chamber body 202 (e.g., sidewall 208). For example, sensor 256B can be coupled to sidewall 208 and can be configured to generate data associated with a pressure of interior volume 206, a temperature of interior volume 206, an amount of radiation within interior volume 206, etc. In other or similar embodiments, sensors 256 can be embedded within the gas panel and/or showerhead 130. In such embodiments, sensors 256 can be configured to generate data associated with a composition, flow rate, and/or temperature of process and/or cleaning gases provided to the interior volume 206 through showerhead 130.

In some embodiments of the present disclosure reference one or more components of process chamber 200. It should be noted that a component of process chamber 200 can include any element or sensor disposed within or coupled to process chamber 200, as described in FIG. 2. In other or similar embodiments, a component of process chamber 200 can include other elements or sensors that are not disposed within or coupled to process chamber 200, but are configured to facilitate performance or monitoring of a substrate process at process chamber 200. For example, a component of process chamber 200 can include one or more sensors that are not disposed within or coupled to process chamber 200, but are configured to generate data associated with substrate 102 or an environment within interior volume 206 before, during, or after a substrate process performed at process chamber 200.

Figure 3:
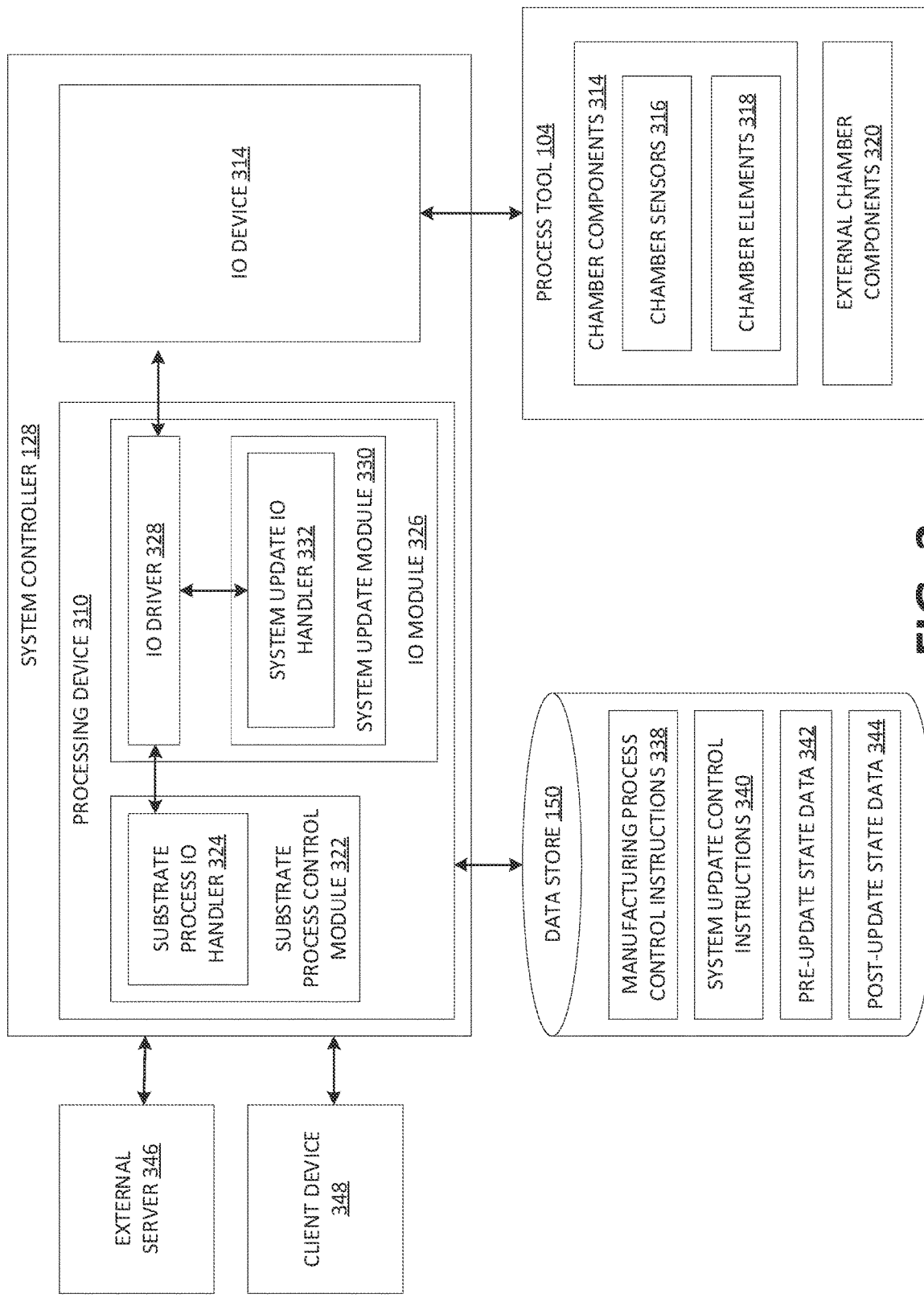
FIG. 3 depicts a system controller for a manufacturing system, according to aspects of the present disclosure.

FIG. 3 depicts a system controller 128 for a manufacturing system, according to aspects of the present disclosure. As described with respect to FIG. 1, system controller 128 can include one or more processing devices 210. System controller 128 can also include an IO device 312. IO device 312 can be coupled to one or more components of process tool 104 over a network and/or over a BUS. For example, IO device 312 can be coupled to one or more components 314 at process chamber 200. As described above, chamber components 314 can include sensors 316 coupled to or disposed within process chamber 200. Chamber components 314 can also include elements 318 (e.g., heating element 254, etc.) that are configured to control an environment of internal volume 206 of process chamber 200. IO device 312 can also be coupled to one or more components 320 of process tool 104 that are not disposed within or coupled to process chamber 200 (i.e., are external to process chamber 200), but are configured to facilitate control and/or monitoring of the environment of internal volume 206 of process chamber 200 before, during, or after a substrate process. IO device 312 can be configured to transmit notifications between system controller 128 and the one or more components of process tool 104 over the network and/or the BUS.

Processing device 210 of system controller can include a substrate process control module 322 and an IO module 326. Substrate process control module 322 can be configured to execute substrate process control instructions 338 before, during or after a substrate process. Substrate process control instructions 338 can be stored at data store 150, in some embodiments. In some embodiments, substrate process control instructions 338 can include instructions that correspond to operations or steps of a process recipe for substrate 102. For example, the process recipe can include an operation to increase a temperature of a heating element of substrate support assembly 248 to a target temperature before a gas is flowed into process chamber via showerhead 230. Substrate process control instructions 338 can include one or more instructions that, when executed by processing device 310, cause substrate process control module 322 to generate a command to cause the heating elements 254 to increase to the target temperature. In other or similar embodiments, substrate process control instructions 338 can include instructions that are associated with maintaining an environment within process chamber 200 between substrate processes. For example, substrate process control instructions 338 can include one or more instructions that, when executed by processing device 310, cause substrate process control module 322 to generate a command to cause one or more components of process chamber 200 to maintain process chamber 200 at one or more target conditions (e.g., maintain a vacuum at process chamber 200, maintain a target temperature at process chamber 200, etc.) after a substrate process is completed at process chamber 200.

IO module 326 can include an IO driver 328 that is configured to forward notifications and/or data included in a notification between IO device 312 and an appropriate IO handler of processing device 310 (e.g., substrate process handler 324 or system update IO handler 332). During a substrate process at process chamber 200, IO device 312 can receive one or more notifications from a component at process tool 104. For example, IO device 312 can receive a notification from a sensor 316 that includes data generated during a substrate process. IO driver 328 can receive the notification from sensor 316 via IO device 312 and can forward the notification, or data included in the notification, to substrate process IO handler 324 of substrate process control module 322.

In response to substrate process IO handler 324 receiving the notification, or data from the notification, from IO driver 328, substrate process control module 322 can identify one or more instructions from substrate process control instructions 338 that correspond to the data of the notification. For example, the data from the notification can indicate a current temperature of a heating element at substrate support assembly 248 of process chamber 200. Substrate process control module 322 can identify one or more instructions from substrate process control instructions 338 that correspond to the temperature data and can determine whether the current temperature satisfies a temperature criterion (e.g., corresponds to a target temperature) in view of the instructions. In response to determining that the current temperature does not satisfy the temperature criterion, substrate process control module 322 can execute one or more instructions from substrate process control instruction 338 to generate a command to cause the heating element to modify the current temperature to satisfy the temperature criterion (e.g., correspond to the target temperature). Substrate process IO handler 324 can transmit the generated command to IO driver 328, which in turn can forward the command to the component of process tool 104 via IO device 312, in accordance with embodiments described herein. In response to the component of process tool 104 receiving the command, the component can cause the heating element of substrate support assembly 248 to increase or decrease the temperature of the heating element to correspond to the target temperature.

In some embodiments, processing device 310 can receive a request to modify or update one or more instructions of substrate process control instructions 338. For example, processing device 310 can receive a request from an external server 346 or a client device 348 coupled to the system controller 128 to modify the one or more instructions of substrate process control instructions 338. Processing device 310 can initiate the modification or update of the instructions in response to the request. For example, processing device 310 can identify a particular instruction of substrate process control instructions 338 and replace the particular instruction with a new instruction, in accordance with the request. In another example, processing device 310 can identify a particular instruction identified in the request and can remove the instruction from substrate process control instructions 338 (e.g., erase the instruction from data store 150). In still another example, processing device 310 can add instructions included in the request to substrate process control instructions 338 (e.g., write the instructions to data store 150).

In some instances, the modification or update to the substrate process control instructions 338 can take a significant amount of time (e.g., seconds, minutes, hours, etc.). During the update, IO driver 328 can transfer direction of IO communications with process tool 104 from substrate process control module 322 to system update module 330 of IO module 326. System update module 330 can be configured to execute system update control instructions 340 during the update of substrate process control instructions 338. System update control instructions 340 can include instructions that, when executed by processing device 310, cause system update module 330 to generate one or more commands that cause components at process chamber 200 to maintain one or more target conditions at process chamber during the update. In some embodiments, system update control instructions 340 can be a subset of substrate process control instructions 338. In an illustrative example, system update control instructions 340 can include instructions that cause system update module 330 to generate a command that cause pump system 228 to maintain a vacuum in interior volume 206 of process chamber 200 during the update. System update 10 handler 332 can transmit the generated command to IO driver 328 which in turn can transmit the command to pump system 228 via IO device 312, as described above. Pump system 228 can maintain the vacuum in interior volume 206 to satisfy the target condition, in accordance with the command.

One or more sensors (i.e., sensors 316 or sensors of external chamber devices 320) can generate data associated with the environment of process chamber 200 during the update and can transmit a notification including the generated data IO driver 328 via IO device 312, as previously described. IO driver 328 can forward the notification, or data included in the notification, to system update IO handler 332. In response to system update IO handler 332 receiving the notification, or the data included in the notification, system update module 330 can respond to the notification in accordance with the system update control instructions 340. For example, the data included in the notification can include temperature data indicating a current temperature of the environment of the process chamber 200 during the update. System update control module 330 can identify one or more instructions from the system update control instructions 340 that correspond with the current temperature of the process chamber 200 environment and execute the one or more instructions, as described above.

In some embodiments, IO driver 328 can transfer direction of IO communications with process tool 104 from system update module 330 to substrate process control module 322 in response to determining that the update to substrate process control instructions 338 is complete. In response to IO driver 328 transferring control over process tool 104 to substrate process control module 322, substrate process control module 322 can execute one or more instructions of the updated substrate process control instructions 338 to perform a substrate process at process chamber 200, in accordance with previously described embodiments.

In some embodiments, in response to detecting that substrate process control instructions 338 are to be updated and prior to receiving control of process tool 104, system update module 330 can generate pre-update state data 342 for process tool 200. For example, before the processing device 310 modifies or updates substrate process control instructions 338, system update module 330 can generate a request to collect a current state or measurement for one or more sensors 316 at process chamber 200. System update IO handler 332 can transmit the request to IO driver 328 which, in turn, can transmit a notification including the request to process tool 104 via IO device 312, as described above. Sensors 316 can generate data indicating a current state of process chamber 200 and can transmit a notification including the generated data to IO driver 328 via IO device 312, as described above. System update IO handler 332 can receive the notification, or the generated data from the notification, from IO driver 328 and system update module 330 can store the generated data as pre-update state data 342 at data store 150. In response to detecting that the update to substrate process control instructions 338 is complete, system update module can collect current state data from the one or more sensors 316 at process chamber 200, as previously described. System update module 330 can store the collected current state data as post-update state data 344 in data store 150. System update module 330 can compare the post-update state data 344 to the pre-update state data 344 to determine whether the current state of the process chamber 200 satisfies a state criterion. In some embodiments, the system update module 330 can determine that the current state of the process chamber 200 satisfies the state criterion in response to determining that a difference between a measurement of post-update state data 344 (e.g., a temperature measurement) and a corresponding measurement of pre-update state data 344 falls below a difference threshold. In response to system update module 330 determining that the state criterion is satisfied, IO driver 328 can transfer control of process tool 104 back to substrate process control module 322, as described above.

It should be noted that although some embodiments of the present disclosure discuss transferring direction of IO communications received at the IO device 314 from the substrate process control module 322 to a system update module 330 in response to an update to manufacturing process control instructions 338, direction of IO communications at IO device 314 can be transferred to system update module 330 in other instances. For example, in response to detecting that the manufacturing process control instructions 338 are not accessible by processing device 310 (e.g., after a software crash has occurred, etc.), IO driver 328 can transfer the direction of IO communications received at IO device 314 to system update module 330, in accordance with embodiments described herein. In responsive to detecting that manufacturing process control instructions 338 are accessible by processing device 310 (e.g., after the software crash has been remedied, etc.), IO driver 328 can transfer the direction of IO communications received at 10 device 314 back to system update module 330, in accordance with previously described embodiments.

Figure 4:
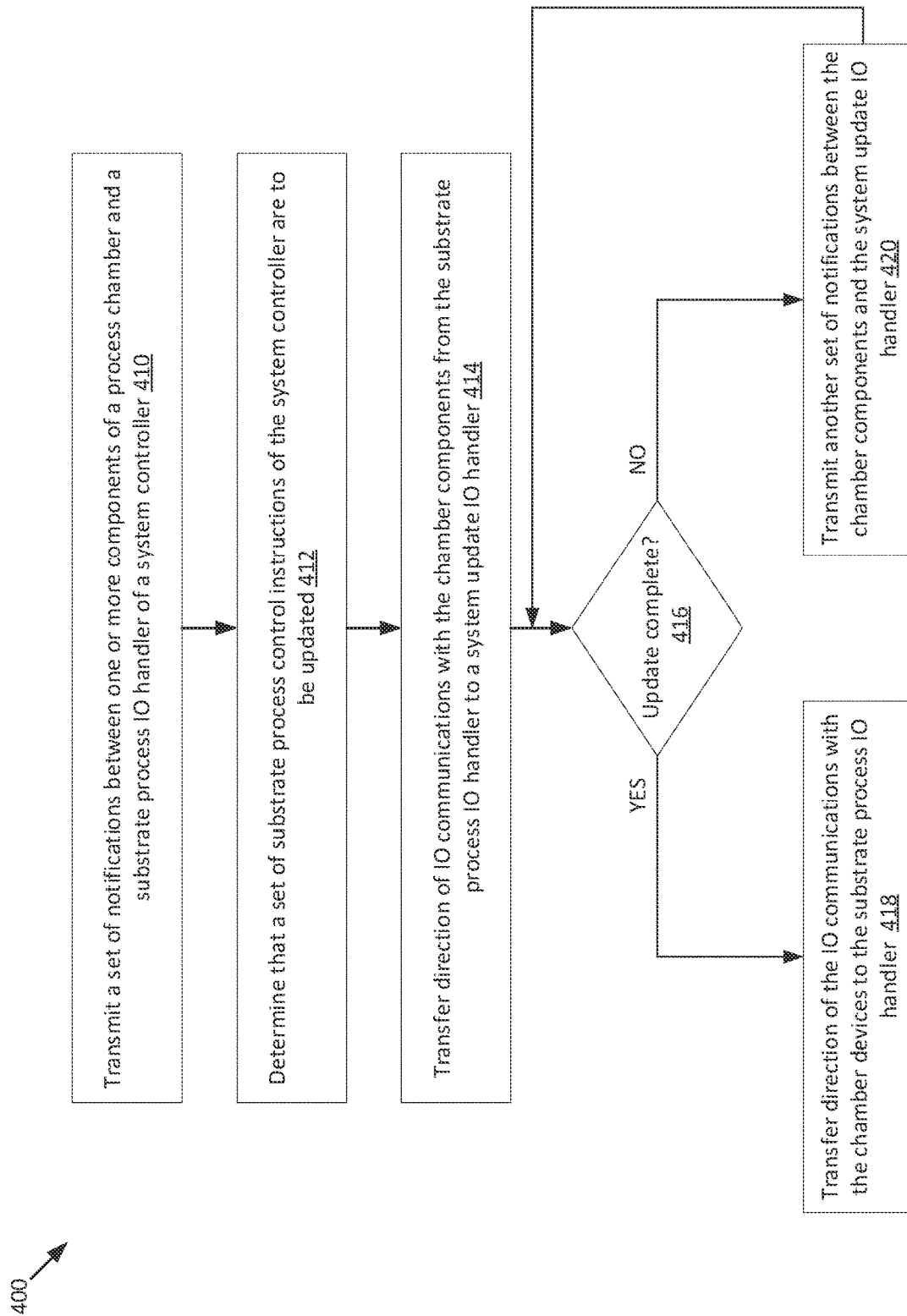
FIG. 4 is a flow chart for a method of input/output (IO) handling during an update process for a manufacturing system controller, according to aspects of the present disclosure.

FIG. 4 is a flow chart for a method 400 of input/output (JO) handling during an update process for a manufacturing system controller, according to aspects of the present disclosure. Method 400 is performed by processing logic that can include hardware (circuitry, dedicated logic, etc.), software (such as is run on a general purpose computer system or a dedicated machine), firmware, or some combination thereof. In some embodiments, method 400 can be performed using IO handler 326 of FIG. 3. For example, method 400 can be performed by IO driver 328 of IO handler 326. In other or similar embodiments, one or more blocks of FIG. 4 can be performed by one or more other machines not depicted in FIG. 3.

At block 410, processing logic transmits a set of notifications between one or more components of a process chamber and a substrate process IO handler. As described previously, the substrate process IO handler can be configured to execute a set of substrate process control instructions (e.g., substrate process control instructions 338) corresponding to a process recipe during a substrate process at the process chamber. The set of notifications can correspond to one or more operations associated with the set of substrate process control instructions. The one or more chamber components can include at least one of a temperature control component, a pressure control component, a humidity control component, a temperature sensor, a pressure sensor, a humidity sensor, an oxygen sensor, a particle detector, a process gas flow sensor, or a cleaning gas flow sensor.

At block 412, processing logic determines that a set of substrate process control instructions of the system controller are to be updated. In some embodiments, an external server or a client device can transmit a request to system controller to update the substrate process controller instructions of the system controller, as described herein. At block 414, processing logic transfers direction of IO communications with the chamber components from the substrate process IO handler to a system update IO handler. In some embodiments, processing logic can transfer direction of the IO communications in response to determining that a process to update the substrate process control instructions is initiated and/or a substrate process at the process chamber is terminated. The system update IO handler can be configured to execute a set of system update control instructions (e.g., system update control instructions 340) that include commands configured to cause the one or more components of the process chamber to maintain an environment of the process chamber at a target condition while the set of substrate process control instructions are updated. In some embodiments, the system update control instructions can be a subset of the substrate process control instructions, as previously described.

At block 416, processing logic determines whether the update to the set of substrate process control instructions is complete. In response to determining that the update to the set of process control instructions is complete, processing logic can continue to block 418. At block 418, processing logic can transfer control of the IO communications with the chamber components to the substrate process IO handler, enabling the substrate process IO handler to execute the substrate process control instructions, as previously described.

In response to determining that the update to the set of process control instructions is not complete, processing logic can continue to block 420. In some embodiments, processing logic can continue to block 420 in response to determining that a current state of the process chamber satisfies a state criterion (i.e., post-update state data for the process chamber corresponds to pre-update state data), as previously described. At block 420, processing logic can transmit another set of notifications between the chamber components and the system update IO handler. The other set of notifications can correspond to one or more operations associated with the system update control instructions, as previously described. The system update IO handler can maintain control of the IO communications until the system update is complete, as illustrated in FIG. 4.

Figure 5:
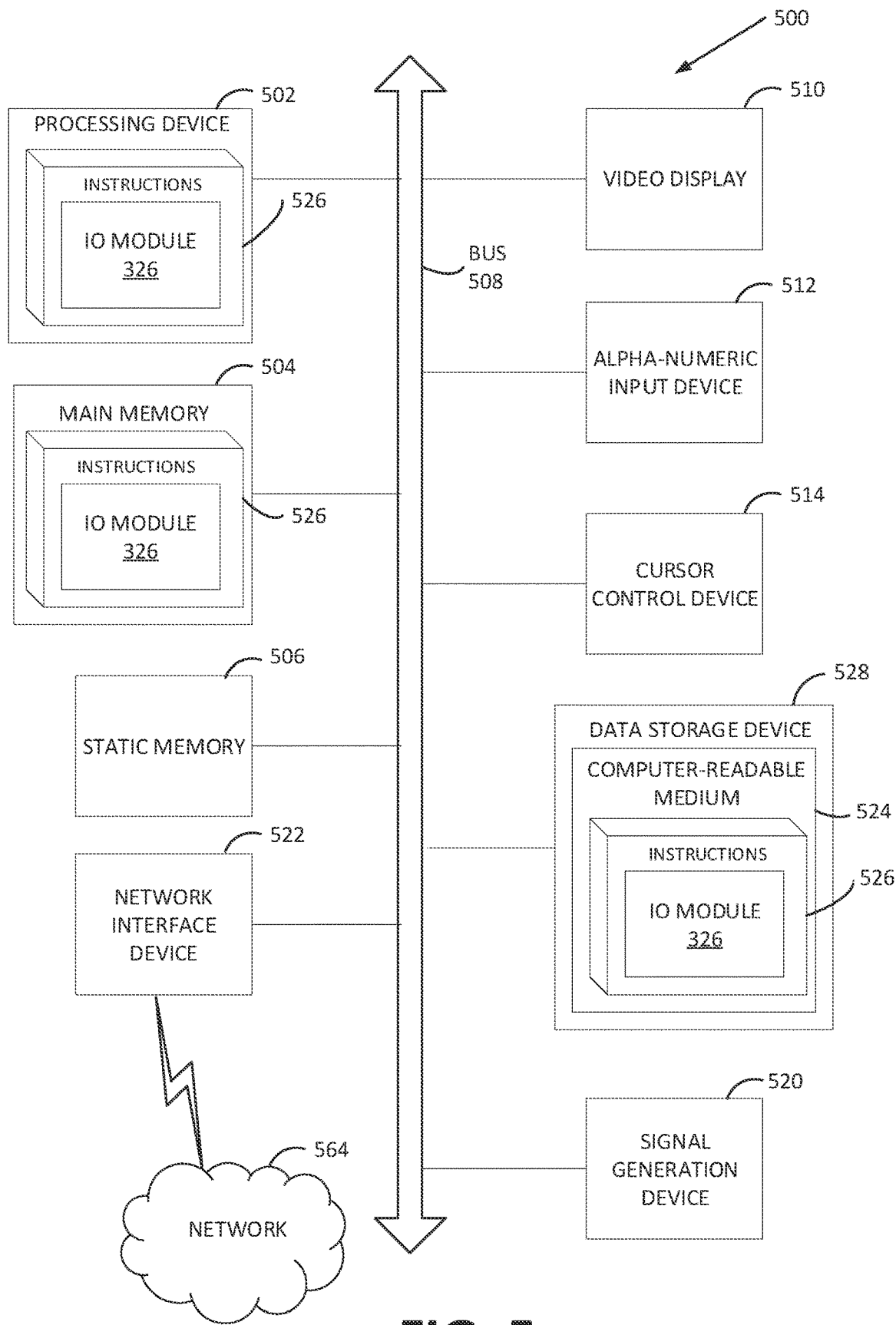
FIG. 5 depicts a block diagram of an illustrative computer system operating in accordance with one or more aspects of the present disclosure.

FIG. 5 depicts a block diagram of an illustrative computer system 500 operating in accordance with one or more aspects of the present disclosure. In alternative embodiments, the machine can be connected (e.g., networked) to other machines in a Local Area Network (LAN), an intranet, an extranet, or the Internet. The machine can operate in the capacity of a server or a client machine in a client-server network environment, or as a peer machine in a peer-to-peer (or distributed) network environment. The machine can be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiments, computing device 500 can correspond to system controller 128 of FIG. 1 or another processing device of manufacturing system 100.

The example computing device 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 528), which communicate with each other via a bus 508.

Processing device 502 can represent one or more general-purpose processors such as a microprocessor, central processing unit, or the like. More particularly, the processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. Processing device 502 can also be or include a system on a chip (SoC), programmable logic controller (PLC), or other type of processing device. Processing device 502 is configured to execute the processing logic for performing operations and steps discussed herein.

The computing device 500 can further include a network interface device 522 for communicating with a network 564. The computing device 500 also can include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 528 can include a machine-readable storage medium (or more specifically a non-transitory computer-readable storage medium) 524 on which is stored one or more sets of instructions 526 embodying any one or more of the methodologies or functions described herein. Wherein a non-transitory storage medium refers to a storage medium other than a carrier wave. The instructions 526 can also reside, completely or at least partially, within the main memory 504 and/or within the processing device 502 during execution thereof by the computer device 500, the main memory 504 and the processing device 502 also constituting computer-readable storage media.

The computer-readable storage medium 524 can also be used to store instructions and data for IO module 326. The computer readable storage medium 524 can also store a software library containing methods that call module 326. While the computer-readable storage medium 524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations can be performed in an inverse order so that certain operations can be performed, at least in part, concurrently with other operations. In another embodiment, instructions or sub-operations of distinct operations can be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   transmitting, by an input/output (IO) driver of a system controller, a first set of notifications between one or more components of a process chamber and a substrate process IO handler of the system controller, wherein one or more of the first set of notifications cause the substrate process IO handler to execute a set of substrate process control instructions corresponding to a process recipe during a substrate process at the process chamber;
   determining that the set of substrate process control instructions is to be updated;
   detecting that the substrate process is terminated at the process chamber; and
   transmitting a second set of notifications between the one or more components of the process chamber and a system update IO handler of the system controller, wherein one or more of the second set of notifications cause the system update IO handler to execute a set of system update control instructions comprising commands which, upon execution, cause the one or more components of the process chamber to maintain an environment of the process chamber at a target condition while the set of substrate process control instructions are updated.

2. The method of claim 1, further comprising:
   determining that the update to the substrate process control instructions is complete; and
   transmitting a third set of notifications between the one or more components of the process chamber and the substrate process IO handler.

3. The method of claim 2, further comprising:
   responsive to detecting that the substrate process is terminated at the process chamber, obtaining a first state of the process chamber before initiation of the update to the substrate process control instructions; and
   responsive to determining that the update to the substrate process control instructions is complete, obtaining a second state of the process chamber after completion of the update to the substrate process control instructions,
   wherein the third set of notifications is transmitted between the one or more components of the process chamber and the substrate process IO handler responsive to a determination that the second state of the process chamber satisfies a state criterion in view of the first state of the process chamber.

4. The method of claim 1, wherein transmitting the second set of notifications between the one or more components of the process chamber and the system update IO handler comprises:
   receiving, from the system update IO handler, a first notification of the second set of notifications, the first notification comprising a command associated causing a first component of the one or more components of the process chamber to maintain the environment of the process chamber at the target condition; and
   transmitting the first notification to the first component via an IO device of the system controller.

5. The method of claim 4, further comprising:
   receiving, from a second component of one or more components of the process chamber, a second notification of the second set of notifications via the IO device of the system controller, the second notification comprising sensor data generated by the second component, wherein the sensor data is associated with the environment of the process chamber; and
   transmitting the sensor data of the second notification to the system update IO handler of the system controller.

6. The method of claim 1, wherein the set of system update control instructions is a subset of the set of substrate process control instructions.

7. The method of claim 1, wherein the one or more components of a process chamber comprise at least one of a temperature control component, a pressure control component, a
   humidity control component, a temperature sensor, a pressure sensor, a humidity sensor, an oxygen sensor, a particle detector, a process gas flow sensor, or a cleaning gas flow sensor.

8. A system comprising:
   a memory; and
   a processing device coupled to the memory, the processing device to perform operations comprising:
      transmitting, by an input/output (IO) driver of a system controller, a first set of notifications between one or more components of a process chamber and a substrate process IO handler of the system controller, wherein one or more of the first set of notifications cause the substrate process IO handler to execute a set of substrate process control instructions corresponding to a process recipe during a substrate process at the process chamber;
      determining that the set of substrate process control instructions is to be updated;
      detecting that the substrate process is terminated at the process chamber; and
      transmitting a second set of notifications between the one or more components of the process chamber and a system update IO handler of the system controller, wherein one or more of the second set of notifications cause the system update IO handler to execute a set of system update control instructions comprising commands which, upon execution, cause the one or more components of the process chamber to maintain an environment of the process chamber at a target condition while the set of substrate process control instructions are updated.

9. The system of claim 8, wherein the operations further comprise:
   determining that the update to the substrate process control instructions is complete; and transmitting a third set of notifications between the one or more components of the process chamber and the substrate process IO handler.

10. The system of claim 9, wherein the operations further comprise:
    responsive to detecting that the substrate process is terminated at the process chamber, obtaining a first state of the process chamber before initiation of the update to the substrate process control instructions; and
    responsive to determining that the update to the substrate process control instructions is complete, obtaining a second state of the process chamber after completion of the update to the substrate process control instructions, wherein the third set of notifications is transmitted between the one or more components of the process chamber and the substrate process IO handler responsive to a determination that the second state of the process chamber satisfies a state criterion in view of the first state of the process chamber.

11. The system of claim 8, wherein to transmit the second set of notifications between the one or more components of the process chamber and the system IO update handler, the processing device is to perform operations comprising:
receiving, from the system update IO handler, a first notification of the second set of notifications, the first notification comprising a command associated causing a first component of the one or more components of the process chamber to maintain the environment of the process chamber at the target condition; and
transmitting the first notification to the first component via an IO device of the system controller.

12. The system of claim 11, wherein the operations further comprise:
receiving, from a second component of one or more components of the process chamber, a second notification of the second set of notifications via the IO device of the system controller, the second notification comprising sensor data generated by the second component, wherein the sensor data is associated with the environment of the process chamber; and
transmitting the sensor data of the second notification to the system update IO handler of the system controller.

13. The system of claim 8, wherein the set of system update control instructions is a subset of the substrate process control instructions.

14. A non-transitory computer readable storage medium comprising instructions that, when executed by a processing device, cause the processing device to perform operations comprising:
transmitting, by an input/output (IO) driver of a system controller, a first set of notifications between one or more components of a process chamber and a substrate process IO handler of the system controller, wherein one or more of the first set of notifications cause the substrate process IO handler to execute a set of substrate process control instructions corresponding to a process recipe during a substrate process at the process chamber;
determining that the set of substrate process control instructions is to be updated;
detecting that the substrate process is terminated at the process chamber; and
transmitting a second set of notifications between the one or more components of the process chamber and a system update IO handler of the system controller, wherein one or more of the second set of notifications cause the system update IO handler to execute a set of system update control instructions comprising commands which, upon execution, cause the one or more components of the process chamber to maintain an environment of the process chamber at a target condition while the set of substrate process control instructions are updated.

15. The non-transitory computer readable storage medium of claim 14, wherein the operations further comprise:
determining that the update to the substrate process control instructions is complete; and transmitting a third set of notifications between the one or more components of the process chamber and the substrate process IO handler.

16. The non-transitory computer readable storage medium of claim 15, wherein the operations further comprise:
responsive to detecting that the substrate process is terminated at the process chamber, obtaining a first state of the process chamber before initiation of the update to the substrate process control instructions; and
responsive to determining that the update to the substrate process control instructions is complete, obtaining a second state of the process chamber after completion of the update to the substrate process control instructions, wherein the third set of notifications is transmitted between the one or more components of the process chamber and the substrate process IO handler responsive to a determination that the second state of the process chamber satisfies a state criterion in view of the first state of the process chamber.

17. The non-transitory computer readable storage medium of claim 14, wherein to transmit the second set of notifications between the one or more components of the process chamber and the system update IO handles, the processing device is to perform operations comprising:
receiving, from the system update IO handler, a first notification of the second set of notifications, the first notification comprising a command associated causing a first component of the one or more components of the process chamber to maintain the environment of the process chamber at the target condition; and
transmitting the first notification to the first component via an IO device of the system controller.

18. The non-transitory computer readable storage medium of claim 17, wherein the operations further comprise:
receiving, from a second component of one or more components of the process chamber, a second notification of the second set of notifications via the IO device of the system controller, the second notification comprising sensor data generated by the second component, wherein the sensor data is associated with the environment of the process chamber; and
transmitting the sensor data of the second notification to the system update IO handler of the system controller.

19. The non-transitory computer readable storage medium of claim 14, wherein the set of system update control instructions is a subset of the set of substrate process control instructions.

20. The non-transitory computer readable storage medium of claim 14, wherein the one or more components of a process chamber comprise at least one of a temperature control component, a pressure control component, a humidity control component, a temperature sensor, a pressure sensor, a humidity sensor, an oxygen sensor, a particle detector, a process gas flow sensor, or a cleaning gas flow sensor.

* * * * *